(12) United States Patent
Jonsson et al.

(10) Patent No.: US 7,097,736 B2
(45) Date of Patent: Aug. 29, 2006

(54) DAIRY WASTEWATER TREATMENT

(75) Inventors: Torsten Jonsson, Hoor (SE); Jan Hellstrom, Lund (SE); Helena Eliasson, Lund (SE); Lars-Ola Myrefelt, Malmo (SE)

(73) Assignee: Alfa Laval Corporate AB, Lund (SE)

( * ) Notice: Subject to any disclaimer, the term of this patent is extended or adjusted under 35 U.S.C. 154(b) by 182 days.

(21) Appl. No.: 10/149,928

(22) PCT Filed: Nov. 30, 2000

(86) PCT No.: PCT/SE00/02387

§ 371 (c)(1),
(2), (4) Date: Sep. 30, 2002

(87) PCT Pub. No.: WO01/49611

PCT Pub. Date: Jul. 12, 2001

(65) Prior Publication Data

US 2003/0168182 A1    Sep. 11, 2003

(30) Foreign Application Priority Data

Dec. 29, 1999    (SE) .................................. 9904755-7

(51) Int. Cl.
*B01D 1/26*    (2006.01)
*B01D 1/28*    (2006.01)
*C02F 1/04*    (2006.01)

(52) U.S. Cl. .................... 159/47.3; 159/24.1; 159/28.6; 159/901; 159/DIG. 8; 426/492

(58) Field of Classification Search ............... 159/47.3, 159/24.1, 28.6, 901, DIG. 8, 17.1; 426/491, 426/492; 210/799, 805, 806
See application file for complete search history.

(56) References Cited

U.S. PATENT DOCUMENTS

| | | | | |
|---|---|---|---|---|
| 1,200,996 A | * | 10/1916 | Soderlund et al. | 159/24.3 |
| 3,351,120 A | * | 11/1967 | Goeldner et al. | 159/13.3 |
| 4,007,094 A | * | 2/1977 | Greenfield et al. | 202/174 |
| 4,279,126 A | * | 7/1981 | Rosenblad | 60/651 |
| 4,303,468 A | * | 12/1981 | Laguilharre et al. | 159/47.1 |
| 4,420,373 A | * | 12/1983 | Egosi | 202/173 |
| 4,448,795 A | * | 5/1984 | Termote | 426/471 |
| 4,586,565 A | * | 5/1986 | Hallstrom et al. | 165/167 |
| 5,256,251 A | * | 10/1993 | Holcombe | 159/47.3 |
| 5,356,640 A | | 10/1994 | Jameson et al. | |
| 5,783,237 A | | 7/1998 | Sanderson et al. | |
| 6,365,005 B1 | * | 4/2002 | Schleiffarth | 203/1 |

* cited by examiner

*Primary Examiner*—Virginia Manoharan
(74) *Attorney, Agent, or Firm*—James Ray & Assoc.

(57) ABSTRACT

A process and apparatus for recycling dairy wastewater wherein the wastewater is supplied to at least one first evaporation apparatus to produce a water distillate and sludge. The sludge is then supplied to at least one second evaporation apparatus arranged in series with the first evaporation apparatus. The process results in recycled water and a final sludge.

3 Claims, 1 Drawing Sheet

DAIRY WASTEWATER TREATMENT

FIELD OF THE INVENTION

Figure 1:
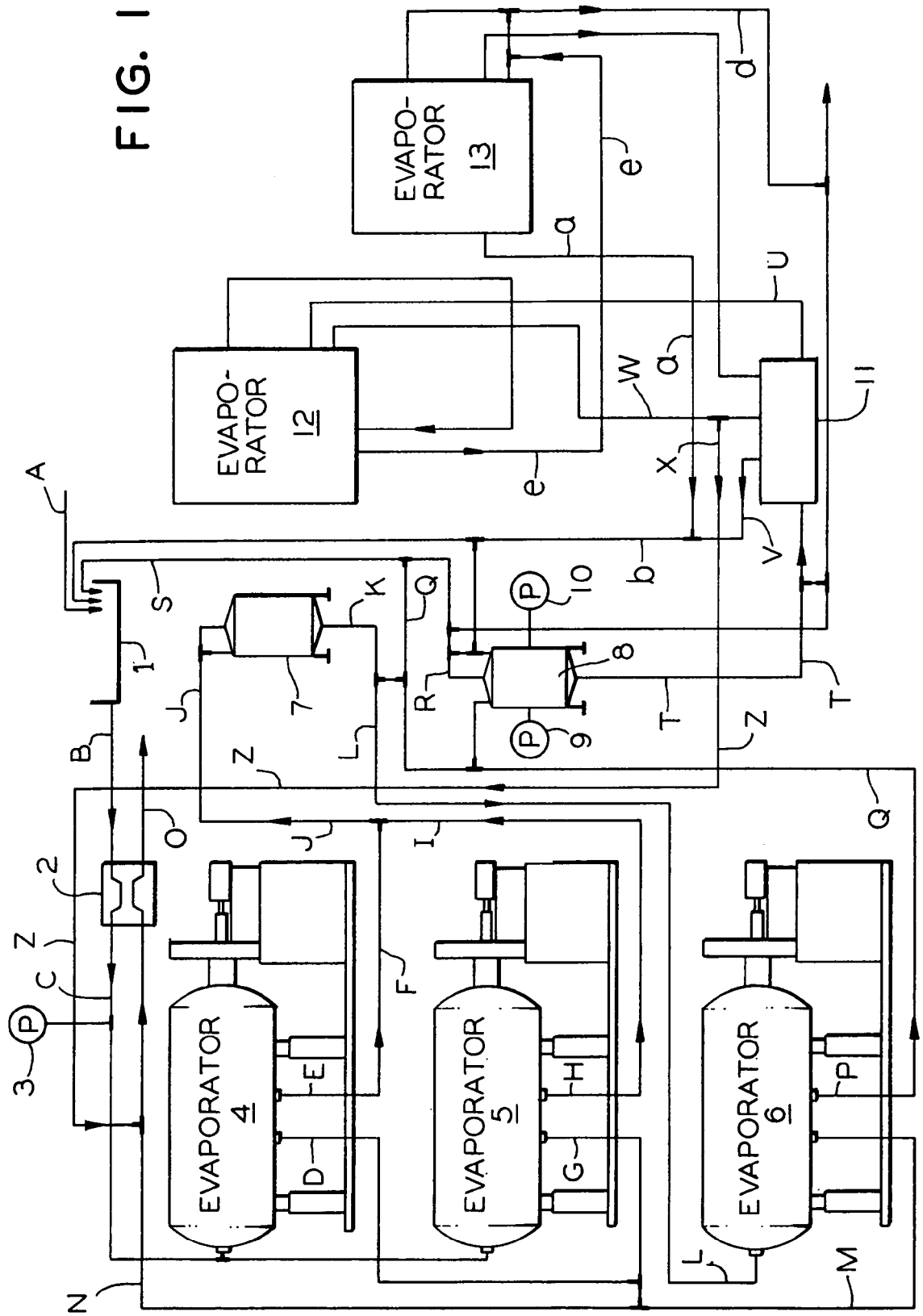

The invention refers to the treatment of dairy wastewater, i.e. animal industrial waste from dairies, which for example includes whey and sludge from separators. More specifically, the invention refers to a process for recycling dairy wastewater as well as a dairy wastewater treatment plant.

BACKGROUND OF THE INVENTION

Today, wastewater is disposed of by sewage treatment plants, in which it is mixed with all different kinds of more or less polluted wastewater. The result is that odors are spread and a questionable, and sometimes a hazardous sludge is obtained, which has to be disposed of.

The wastewater from a dairy can amount to 20–30 million liters, which requires large areas for sedimentation basins for settleable solids. Such amounts require the corresponding amounts of raw water. Since water becomes a more and more expensive raw material, its economic effects can not be underestimated. For example, in Saudi Arabia the water costs are SEK 25 per $m^3$. Pure water requires substantial investments.

In modern plants for treating wastewater from dairies gravity thickening is used in order to improve the sedimentation rate, for example by releasing fine air bubbles as in a plant of the type dissolved air flotation (DAF). However, sufficiently pure water can not be obtained with an ordinary plant for wastewater treatment of the DAF type when wastewater from a dairy is treated. Furthermore, this type of water purification does not result in a sufficiently pure water to be reused as a technical water or as a raw water.

With the above-mentioned volumes of wastewater from a dairy an overflow may occur without control and the wastewater may reach small waters which can be very sensitive to this discharge. The average characteristics of the wastewater from a milk processing includes a biochemical oxygen demand (BOD) of about 1,000 mg/l, a chemical oxygen demand (COD) of about 1,900 mg/l, a total solids content of 1,600 mg/l, and a suspended solids content of 300 mg/l. These figures dramatically exceed those permitted by governments in different countries. In Australia for example, the maximum allowable amount of BOD to be discharged to a recipient, such as a river, is 180 ppm.

SUMMARY OF THE INVENTION

The purpose of the invention is to provide a process of dairy wastewater treatment for obtaining a more clean water than with existing processes. A further purpose of the invention is to provide a sludge from such a wastewater treatment, which could be used as an animal fodder.

In order to achieve this purpose the process according to the invention has the characterizing features of claim 1.

In order to explain the invention in more detail an illustrative embodiment thereof will be described below reference being made to the accompanying drawing in which:

BRIEF DESCRIPTION OF THE INVENTION

FIG. 1 is a flow diagram of a preferred embodiment of a dairy wastewater treatment plant.

DETAILED DESCRIPTION OF THE INVENTION

As shown in FIG. 1 wastewater A from a dairy factory is supplied to an effluent pit 1 of about 1 million liters. Preferably, wastewater is first pumped through a filter which removes bigger lumps (not shown). The wastewater A supplied has a BOD level of less than 3 800 ppm and a COD level of less than 2 200 ppm and the wastewater treatment plant is adapted to feeds of 3 millions liters per 24 hours.

The wastewater is "standardized" (c.f. below) in the effluent pit 1 with reference to its dry matter (DM) content. A first effluent B of 0.5% DM and 4 bar is via a heat exchanger 2 conveyed to a first evaporator 4 and a second evaporator 5. A first pump 3 supplies antiscale in order to provide a second effluent C which is prevented from forming deposits of overheated material on the evaporator heating surface.

These evaporators are adapted to high flow rates and have for example been used for the evaporating of sea-water. Preferably, the evaporators are so called Vacuum Vapor Compression units. In such a device the heat delivered by compressed vapor at sub-atmospheric pressure and corresponding low temperatures is used for evaporating the wastewater.

First and second sludges E, H from the first 4 and second 5 evaporators, respectively, are adapted to third and fourth sludges F, I of about 3.3% DM. These are mixed to a first mixed sludge J and conveyed to a first buffer tank 7, from which a fifth sludge K may be further concentrated to a sixth sludge L before it is allowed to enter a third evaporator 6 of the same kind as those mentioned above. From this evaporator a seventh sludge P is removed which is further adapted to an eighth sludge Q of about 10% DM.

A first distillate M from the third evaporator 6 is mixed with second and third distillates D, G from the first and second evaporators, 4, 5, respectively, to a mixed distillate N. This distillate has a BOD level of less than 21 ppm and a COD level of less than 150 ppm. The average BOD level is about 14 ppm and the average COD level is about 57 ppm.

The eighth sludge Q is conveyed to a second buffer tank 8. A second pump 9 supplies this tank with antiscale. A third pump 10 provides acid for the buffering of the tank 8.

Sedimented sludge T of pH 7–8 is conveyed to a fourth evaporator 12. This evaporator is preferably a so called Casette Evaporator, i.e. a closed unit which earlier has been used for concentrating juice or for removing residual moisture from for example whey to obtain solid or semi solid components as well as a condenser condensate. The sludge treatment according to the invention results in this evaporator in a first condensate V, and a concentrated product in the form of a ninth sludge e.

The ninth sludge e is conveyed to a fifth evaporator 13 which is of the same type as the fourth evaporator 12. The evaporation process results in a tenth sludge d and a second condensate X. Here, the sludge is further concentrated to a final sludge d of about 30% DM.

A condensate a from the fifth evaporator 13 is mixed with the first condensate V to a first mixed condensate Z.

At last, the first mixed condensate Z is mixed with the mixed distillate N to recycled water O which is allowed to the heat exchanger 2.

The water of the liquid wastewater material is according to the invention evaporated in two steps. Of course, the number of evaporators depends on the capacity of the system to be used. A plant with only one evaporator of each type in series is suitable for about 1 million liters of wastewater per 24 hours, which figure can be increased by adding two of the first and second type evaporators in series.

In the preferred embodiment of the invention the dairy wastewater treatment plant according to the invention is adapted to flow at 3 millions liters per 24 hours. In order to optimize the process technically as well as economically two types of evaporators are arranged in series.

The first type of evaporator, preferably a Vacuum Vapor Compression unit, is not suitable for evaporation to a dry matter content of more than 3–10%. If this limit is exceeded deposits of overheated material will occur on the heating surface of the evaporator in dependence of the equipment utilized.

The evaporation process in the first type of evaporator results in one stream of a distillate and one stream of a sludge which is concentrated to about 3.3% dry matter (DM). The wastewater condensate from the first evaporator type has a COD of less than 57 ppm and a BOD of less than 21 ppm.

The wastewater treated in the first type of evaporator is according to the invention fed to a second type of evaporator. The change of evaporator type should take, place when the feed reaches a dry matter content of 3–10%. The second type of evaporator is designed to successfully treat feeds of 10% dry matter, which is preferred. Deposits will not occur on the heating plates of this evaporator since it is adapted to aqueous liquids with high dry matter contents.

Thus, in the end of the first evaporator type clean water as well as a sludge is obtained, the sludge directly being transferred to the second evaporator type, preferably a Cassette Evaporator or Plate Evaporator, for further concentration. More water is obtained as well as a further concentrated sludge. The inflow to the second evaporator type is from 1 to 50 ton per hour, the sludge being concentrated to about 30% DM or higher.

The final sludge is transported to a buffer tank, in which the pH is automatically adjusted to a pH level between 7–8. Finally, the final sludge is pumped to a container for further transport. The sludge can then be used directly or further concentrated to a dry product.

The condensate obtained from the second type of evaporator has a BOD of about 36 ppm and a COD of about 99 ppm. The condensate is mixed with the condensate from the first type of evaporator, a completely recycled water being obtained.

An advantage of the inventive method is that the resulting recycled water without any further treatment can be returned to any of the water-supplies with a quality of technical water. The water can also be discharged into a suitable recipient, such as a river or the sea.

In principle, nothing of the wastewater is discarded. Everything is reused. The water can be reused in the dairy as a technical water or as a raw water. In this case the water has to be further purified from volatile odorous substances which accompany the water during the evaporation procedure. This can be accomplished by physically removing these substances, for example by passing the water through a filter of active carbon. In order to supply pure water to the food industry the water is subjected to radiation, e.g. UV-radiation. This procedure guarantees a microbiologically pure water.

The quality of the recycled water is in accordance with WHO guideline values as well as the technical requirements of most countries:

| Taste | None |
|---|---|
| Smell | None |
| Turbidity | Max. 5 NTU |
| Colour | Max. 20 mg/l Pt |
| Oxygen demands | Max. 20 mg/l $KMnO_4$ |
| total dissolved solids | Max. 500 mg/l |

An example of the quality of the waste water feed according to the invention is shown in Table 1 below.

TABLE 1

| Component | | |
|---|---|---|
| Conductivity | µS/cm | 4,560 |
| pH | | 6–11 |
| Dissolved Solids | ppm | >2,700 |
| Suspended Solids | ppm | >250 |
| $NH_4$ (as N) | ppm | <2.3 |
| Na | ppm | <1,000 |
| Mg | ppm | <20 |
| Ca | ppm | <55 |
| Fe | ppm | <3.5 |
| Fe filtered | ppm | |
| $PO_4$ (as P) | ppm | <45 |
| $CO_3$ (as $CaCO_3$) | ppm | <210 |
| Total Alkalinity as $CaCO_3$ | ppm | <940 |
| Cl | ppm | <300 |
| $SO_4$ (as S) | ppm | <20 |
| $SiO_2$ | ppm | <9.2 |
| K | ppm | <30 |
| Total Solids | % | <0.5% |
| Ash (dry basis) | % | <47% |
| Total N | ppm | <22 |
| Protein | % | <0.1 |
| Fat/oil | ppm | <25 |
| COD | ppm | <3,800 |
| BOD | ppm | <2,200 |
| Free chlorine | ppm | 0.00 |

According to the invention a more environmentally acceptable process is obtained than with previous processes for treating wastewater from dairies because of the very low BOD and COD levels as well as the low turbidity of the recycled water. This should be compared with a traditional wastewater plant of the type DAF, in which a reduction of only about 60–70% can be obtained.

Both products of the wastewater process—water and sludge—have a potential economic value, since both are pure enough to be reused. In addition, neither the water nor the sludge has to be disposed of. This more than compensates for the higher investment costs than for traditional plants.

As much as 98% of the wastewater results in a distillate/condensate which can be reused in the dairy. This means that the dairy is more or less self sufficient with water and that a minimal usage of raw water is required.

The wastewater recycled according to the invention has a value in itself and can for example be further used in for example vegetable gardening.

The wastewater from a dairy is in principle very diluted milk in water. Thus, the sludge contains valuable nutritive matter, such as protein (7.4%), carbohydrates, fat and salts. The sludge can be used directly for the manufacturing of an animal fodder or further concentrated by evaporation to a dry product.

The process according to the invention is a very environmentally friendly process since no polluted water is discharged from the plant, less raw water is used, no hazardous sludge has to be disposed of, no odours are spread, and there is less risk of an accidental untreated overflow to the environment. Furthermore, the process efficiency independent of external parameters.

Another advantage of the invention is its low space requirements, the high reliability and availability of the evaporators used, and the low maintenance costs.

The invention claimed is:

1. A process for recycling dairy wastewater comprising the steps of:

supplying said wastewater to at least one first evaporation apparatus consisting of a Vacuum Vapor Compression Unit, to produce a sludge;

supplying said sludge to at least one second evaporation apparatus consisting of a Plate Evaporator, arranged in series with said at least one first evaporation apparatus, wherein said sludge produced in said at least one first evaporation apparatus and being supplied to said at least one second evaporation apparatus comprises a dry matter content of 3–10%, to produce a recycled water and a final sludge.

2. A process as recited in claim 1 wherein said final sludge is concentrated to a dry matter content of about 30%.

3. A process as recited in claim 2 comprising the step of passing said recycled water through a filtering means to remove odorous substances therefrom.

* * * * *